United States Patent [19]

Ford

[11] 4,145,206
[45] Mar. 20, 1979

[54] PELLET FOR GROWING SEED AND PROCESS FOR MAKING SAME

[75] Inventor: Stuart Ford, Manakin, Va.

[73] Assignee: Stuart Ford Incorporated, Richmond, Va.

[21] Appl. No.: 778,453

[22] Filed: Mar. 17, 1977

[51] Int. Cl.$^2$ .................................................. C05F 11/00
[52] U.S. Cl. ........................................ 71/23; 71/64 R; 71/64 F; 71/64 SC; 47/57.6
[58] Field of Search ................. 71/1, 11, 23, 63, 64 A, 71/64 E, 64 F, 64 R, 64 SC, 64 JC, 33, 58, 60; 47/DIG. 1, 57.6

[56] References Cited

U.S. PATENT DOCUMENTS

| | | | |
|---|---|---|---|
| 1,645,001 | 10/1927 | Hodges | 71/23 |
| 1,944,788 | 1/1934 | Genz | 71/23 X |
| 3,197,302 | 7/1965 | MacBride | 71/63 X |
| 3,954,263 | 5/1976 | Whelan et al. | 71/64 F |

FOREIGN PATENT DOCUMENTS

| | | | |
|---|---|---|---|
| 4788 | 8/1971 | Japan | 71/23 |

*Primary Examiner*—Ferris H. Lander
*Attorney, Agent, or Firm*—Stephen E. Feldman; Marvin Feldman

[57] ABSTRACT

A pellet and a process for making same are disclosed wherein the pellet comprising a high percentage, of 75% by weight and greater, of comminuted vegetable matter, particularly peanut shells, an inorganic fertilizer and a plurality of seeds. The peanut shells serve as a growing medium for the seeds. In one preferred aspect the pellets are freeze-dried to levels of less than about 5% moisture so as to minimize the seed exposure to moisture prior to use. The pellets are particularly useful in growing grass seed for lawns and the like.

19 Claims, 4 Drawing Figures

PELLET FOR GROWING SEED AND PROCESS FOR MAKING SAME

This invention relates to a pellet for growing seed and the process for making same.

In Dean et al I, U.S. Pat. No. 1,918,454, granted July 18, 1933 and Dean et al II, U.S. Pat. No. 1,918,900, granted July 18, 1933, there is disclosed a free-running fertilizer consisting of a major proportion of inorganic fertilizer and a minor proportion of vegetable matter.

Ellis, U.S. Pat. No. 976,793, granted Nov. 27, 1910 and Moore, U.S. Pat. No. 3,878,304, granted April 15, 1975 also relate to providing a plant food by combining a fertilizer with vegetable matter.

Such prior art fertilizer composition had to be admixed with or dispersed with grass seed in use and the seed was not in intimate contact with the fertilizer.

Whelan et al, U.S. Pat. No. 3,954,263 discloses a golf tee wherein a plastic coating protected the inside containing grass seed, plant food and a cellulose carrier as a binder material. Bigelow et al U.S. Pat. No. 3,914,900 granted Oct. 28, 1975, Gordos, U.S. Pat. No. 3,884,479, granted May 20, 1975 and Hegl, U.S. Pat. No. 2,081,667, granted May 25, 1937 also disclose encapsulated seeds, while Brink, U.S. Pat. No. 3,555,730, granted Jan. 19, 1971 and Schreiber et al, U.S. Pat. No. 3,545,129, disclose methods for encapsulating seeds.

The prior art sought to encapsulate the seed in a protective jacket prior to use. Still further, the prior art seed capsules were not directed to providing a growing medium for the seeds but when such seeds were released into the soil, the soil was the growing medium.

It has now been found that a pellet comprising a combination of seeds, inorganic fertilizer and a relatively large proportion of a comminuted vegetable matter growing medium is useful in both protecting the seed prior to use and providing an inherent growth environment within the pellet itself.

The aforesaid as well as other objects and advantages as will become apparent from a further reading of the specification and in conjunction with the accompanying drawings in which.

Broadly speaking, the pellet of this invention is one which contains a plurality of seeds, an inorganic fertilizer and comminuted vegetable matter which in use serves as a growth medium for the fertilized seeds.

Figure 1:
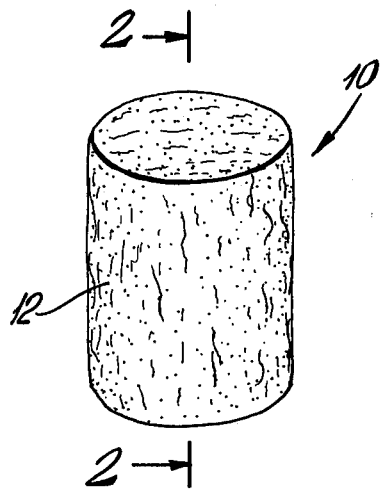
FIG. 1 is a perspective view of a pellet according to the present invention.
Figure 2:
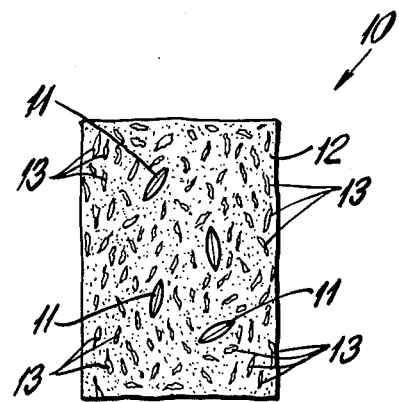
FIG. 2 is a sectional view taken along line 2—2 of FIG. 1.

A typical composition of a pellet according to the present invention is as follows:

vegetable matter: 80–100 parts by weight
inorganic fertilizer: 10–25 parts by weight
grass seed: 0.1–0.5 parts by weight
water: 5–20 parts by weight Referring to FIGS. 1 and 2 there is shown a pellet according to the present invention generally referred to as 10. Pellet 10 comprises a combination of grass seeds 11, inorganic fertilizer 12 and comminuted peanut shells 13, in an integral structure having a generally cylindrical shape, although the pellet may be formed in any desirable shape.

Figure 3:
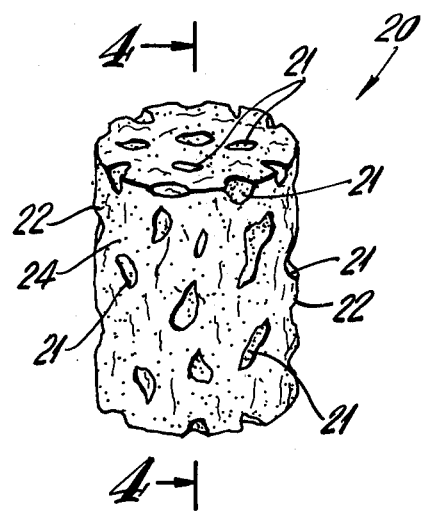
FIG. 3 is a perspective view of a pellet of another embodiment of the present invention.
Figure 4:
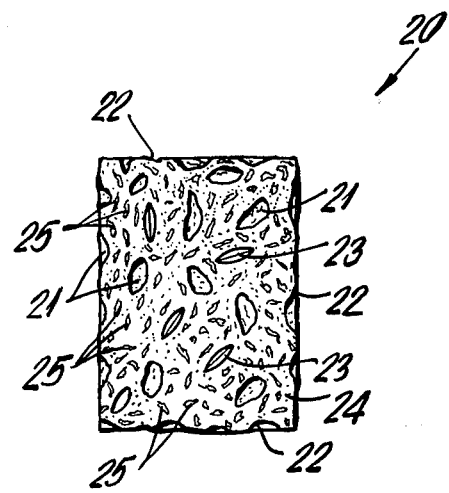
FIG. 4 is a sectional view taken along line 404 of FIG. 3.

Referring now to FIGS. 3 and 4, there is shown an alternate embodiment of the pellet generally referred to as 20. Pellet 20 is the product resulting from the freeze-drying of pellet 10, which results in the formation of voids 21 giving an irregular surface 22. Pellet 20 like pellet 10 comprises grass seeds 23, an inorganic fertilizer 24 and comminuted vegetable matter such as peanut shells 25.

By the term "comminuted vegetable matter" used hereinbefore and hereinafter throughout the specification, it is meant such vegetable matter as will serve as a growth medium for the fertilized seed when used.

Suitable growth media include comminuted peanut shells, dried bean shells, cotton-seed meal and the like. Most preferred is the particulate form of peanut shells.

In one specific aspect, the present invention contemplates employing relatively large percentages of comminuted vegetable matter, particularly peanut shells. By the term "relatively large percentages" it is meant at least 75% by weight of the pellet and preferably at least 80–90% by weight. Without wishing to be bound by any theory or mechanism, it is believed that insofar as the peanut shells are found to serve as a growth medium as opposed to merely a binder, the large percentages are found useful in the pellet.

Inorganic fertilizers useful pursuant to this invention are those comprising at least one carbonate, one nitrate and a phosphate; and wherein one of the above has a potassium cation or wherein there is a potassium salt other than the above carbonate, nitrate or phosphate. Such other potassium salts include potassium chloride, potassium sulfate, and the like. Suitable carbonates include calcium carbonate (limestone), potassium carbonate, ammonium carbonate, and the like; suitable nitrates include ammonium nitrate, potassium nitrate, calcium nitrate, and the like; and suitable phosphates include ammoniated superphosphoric acid, phosphoric acid salts, superphosphates, polyphosphates, potassium phosphate, and the like. The several inorganic fertilizer salts are preferably dissolved or slurried in water, to which is added the peanut shells and last the grass seed to avoid premature germination. The product may be dried, and preferably rapidly freeze-dried.

In inorganic fertilizer is generally present in an amount of from about 10 to about 35% by weight of pellet.

Seeds that are considered useful in the pellet of this invention, include the grass seeds such as Kentucky Blue Grass, rye grass, fescue grass and the like. Other seeds may also be useful pursuant to the invention.

The grass is seed usually present in an amount of from about 1 to 2% by weight of the pellet.

While the normal pellet contains from 5 to 20% moisture, it is desirable to limit the moisture in the pellet and in a preferred aspect of this invention, the pellet is freeze-dried to less than about 5% by weight moisture. In freeze-drying, the pellet contains more voids than without freeze-drying. The highly voided pellet provides a most receptive large surface area pellet which is readily useful when deposited in or on the soil.

The following example is given for the purpose of further illustrating but not limiting the invention.

A lot of tan dusty meal peanut shells was found to the following Rotap screen analysis:

| Rotap | (%) 3 minute Rotap |
|---|---|
| 16 | 1.0 |
| 18 | 1.0 |
| 20 | 5.0 |
| 30 | 27.0 |
| 40 | 16.0 |
| 50 | 19.0 |
| −50 | 31.0 |

Superphosphate (18%) was pulverized.

Ammonium nitrate pills were dissolved in the water required.

Potassium chloride granules were readily dissolved in the minimum water required.

The superphosphate (dry), ammonium nitrate (sol.) and potassium chloride (sol.) were mixed for 15 minutes in proportions in accordance with the table below, wherein the weights for the inorganic fertilizer indicate dry weight.

Three batches were segregated as per the table below, and the batches were permitted to temper for approximately one-half hour and then in turn returned to the mixer where the grass seed in the below-indicated proportions was added with an additional 3 minutes mixture.

In this manner, the grass seed was in the moist mix for approximately 10 minutes for each of the three batches.

The limestone is added as a slurry or may be added dry.

A pellet mill was adjusted with the peanut feed as aforesaid, and 40 pounds of each batch was formed into pellets. Each sample was cooled and allowed to dry as quickly as possible to minimize the time at high temperature and moisture.

The following table, in which all numbers are in pounds, unless otherwise indicated:

| Batch | Peanut | Limestone | Nitrate | Phosphate | Potash | Ky. Blue Grass | Rye Grass | Fescue | H₂O | H₂O% |
|---|---|---|---|---|---|---|---|---|---|---|
| I | 90.7 | 7.7 | 0.3 | 7.0 | 0.2 | 0.3 | 0.1 | — | 11.8 | 15–16 |
| II | 90.7 | 7.7 | 0.3 | 7.0 | 0.2 | 0.15 | 0.1 | 0.15 | 11.8 | 15–16 |
| III | 90.7 | 7.7 | 0.3 | 7.0 | 0.2 | — | 0.1 | 0.3 | 11.8 | 15–16 |

One distinct advantage of the present invention is that both the comminuted vegetable matter growth medium and the inorganic fertilizer binder are compatible with the soil so that there is no residue of incompatible material in soil when the pellet is dispersed therein.

The preceding examples can be repeated with similar success by substituting the generically and specifically described reactants and operating conditions of this invention for those used in the preceding examples.

From the foregoing description, one skilled in the art can easily ascertain the essentially characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A dried pellet for growing seed consisting of:
   a plurality of seeds;
   an inorganic fertilizer; and
   a growing medium comprising comminuted vegetable matter, whereby the pellet protects the seed while providing a growth system; and wherein said pellet is formed with a plurality of voids, said voids being formed by intensive drying of said pellet.

2. The pellet of claim 1, wherein the seeds are grass seeds and wherein the comminuted vegetable is peanut shells.

3. The pellet of claim 2, said inorganic fertilizer comprising a carbonate, a nitrate, and a phosphate wherein at least one of the above has a potassium cation or a potassium salt other than the above.

4. The pellet of claim 3, wherein the carbonate is limestone, the nitrate is ammonium nitrate and the phosphate is super phosphate.

5. The pellet of claim 4, comprising the following composition:

peanut shells: 80–100 parts by weight
limestone: 5–10 parts by weight
ammonium nitrate: 0.1–0.5 parts by weight
superphosphate: 5–10 parts by weight
potash: 0.1–0.5 parts by weight
grass seed: 0.1–0.5 parts by weight
water: 5–20 parts by weight.

6. The pellet of claim 2, wherein the peanut shells are present in an amount of at least about 75% by weight of the pellet.

7. The pellet of claim 6, wherein the grass seed is from about 1 to about 2% by weight of the pellet.

8. The pellet of claim 1, having a moisture content of less than about 5% by weight.

9. The pellet of claim 1, wherein the pellet is intensively dried by freeze-drying.

10. A process for preparing pellets for growing seed comprising;
   mixing comminuted vegetable matter growing medium with an inorganic fertilizer to interdisperse the materials, said fertilizer being disposed in water, and mixing grass seed to disperse the grass into said mix and forming the aforesaid mix into pellets, and further comprising intensive drying of the pellets to form voids in the pellets.

11. The process of claim 10, wherein the drying of the pellets to a water content less than about 5% by weight.

12. The process of claim 11, wherein the drying is by freeze-drying.

13. The process of claim 10, wherein the inorganic fertilizer is first dissolved in water prior to mixing with the grass seed.

14. The process of claim 10, wherein the inorganic fertilizer comprises a carbonate, a nitrate and a phosphate.

15. The process of claim 10, further comprising the first step of comminuting the vegetable matter.

16. The process of claim 15, wherein the vegetable matter comprises peanut shells.

17. The process of claim 16, wherein the peanut shells is at least about 75% by weight of the pellets.

18. The process of claim 17, wherein the grass seed is from about 1 to about 2% by weight of the pellet.

19. The process of claim 10, wherein the pellets have the following composition:

vegetable matter: 80–100 parts by weight
inorganic fertilizer: 10–25 parts by weight
grass seed: 0.1–0.5 parts by weight
water: 5–20 parts by weight.

* * * * *